United States Patent Office 3,047,388
Patented July 31, 1962

3,047,388
COLOR PHOTOGRAPHY
Theodore Le Sueur Cairns, Greenville, Del., assignor to E. I. du Pont de Nemours and Company, Wilmington, Del., a corporation of Delaware
No Drawing. Filed Nov. 18, 1958, Ser. No. 774,586
5 Claims. (Cl. 96—55)

This invention relates to color photography and more particularly to color formation with a new class of color-coupling photographic developers and to novel color developer solutions.

Aryldiamines, particularly p-phenylenediamine and its N,N'-dialkyl derivatives, have been used in color photography as developers which couple with color formers during the development of exposed silver halide emulsions containing a latent image to produce quinone-imine or azomethine dyes. However, the aryldiamines have the disadvantage that they are absorbed by the skin and give rise to dermatitis. Accordingly, color development processes with improved characteristics and freedom from toxicity represent a highly desirable goal.

There has now been discovered a process for developing color images by treating an exposed silver halide emulsion layer containing as a color former at least one compound capable of reacting with tetracyanoethylene to form a dye with a compound of the formula:

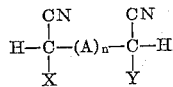

in which A is arylene, $n$ is 0 or 1, X is —CN, —COOR, —CONH$_2$, —CONHR, —CONR$_2$, —COR, —NO$_2$, p—O$_2$N—aryl, or p—NC—aryl and Y is —CN, —COOR, —CONH$_2$, —CONHR, —CONR$_2$, —COR, —SO$_2$R, —NO$_2$, —F, —Cl, —Br, —OR, —ONO$_2$, —OSO$_2$R, or —OCOR and R is hydrocarbyl, i.e., alkyl, cycloalkyl, aryl, or aralkyl hydrocarbon containing 1 to 18 carbon atoms. Suitable hydrocarbyl radicals include methyl, ethyl, dodecyl and hexadecyl; cyclopentyl and cyclohexyl; phenyl and naphthyl; benzyl and acenaphthyl.

Developer solutions for use in this invention are prepared by dissolving from 0.01% to 5% by weight of one or more compounds of the above formula in an aqueous medium having a pH in excess of 7.6. The desired alkalinity may be obtained by incorporating in the medium suitable bases or salts, including alkali metal bicarbonates, such as sodium bicarbonate or potassium bicarbonate, alkali metal carbonates, alkali metal hydroxides, alkali metal bisulfites, alkali metal borates and alkali metal phosphates.

In the process of this invention during the development of exposed silver halide or latent image, the polycyano compounds indicated above are oxidized. In the first step of oxidation, two hydrogen atoms are removed and a unit of carbon-to-carbon unsaturation is introduced into the molecule. The oxidized product is active in the oxidized state and reacts with the color former present in the emulsion to produce the final color of the image. With developers in which Y is —CN, —COOR, —CONH$_2$, —CONHR, —CONR$_2$, or —COR, the reaction with the color former takes place by condensation with the formation of hydrogen cyanide, the cyano group coming from the oxidized developer and the hydrogen from the color former. With developers in which Y is —F, —Cl, —Br, —NO$_2$, —ONO$_2$, —OSO$_2$R, —OR, —OCOR, or —SO$_2$R, reaction with the color former may occur by elimination of hydrogen cyanide as above, but these Y groups may be more reactive than a cyano group in the oxidized product from the developer, and the condensation reaction with the color former may preferentially take place with elimination of HY.

It is obvious that the color former must have an available hydrogen atom, and the operable color formers are defined as those capable of condensing with tetracyanoethylene to form a tricyanovinyl compound which is a dye. This definition is chosen for convenience since tetracyanoethane is the simplest developer of this invention. However, it is to be understood that the developers other than tetracyanoethane embraced by the above formula yield oxidized products which react with the color formers in a manner similar to tetracyanoethylene.

Among the color formers which meet the requirements of the above definition are the following:

(1) Primary aromatic amines in which neither of the annular carbons immediately adjacent to the carbon bonded to the amino substituent is directly bonded to hydrogen or halogen and in which hydrogen is bonded to the annular carbon in the 4-position, the carbon bonded to the amino group being considered in the 1-position.

(2) Secondary and tertiary aromatic amines in which hydrogen is bonded to the annular carbon in the 4-position.

(3) Heterocyclic amines in which the ring is resonance stabilized and contains at least one carbon bonded to hydrogen and in which only two bonds of the nitrogen are attached to the ring.

The amines of items 1–3 are disclosed in U.S. Patent 2,762,810 and yield C-tricyanovinylamines on reaction with tetracyanoethylene.

(4) Primary and secondary aliphatic and cycloaliphatic amines and aralkylamines.

(5) Primary aromatic amines in which at least one ring carbon immediately adjacent to the carbon attached to the amino group is directly attached to hydrogen or halogen.

(6) Primary aromatic amines having no hydrogen directly attached to ring carbons in the 2-, 4-, and 6- positions, considering the carbon attached to the amino group as being in the 1-position.

(7) Secondary aromatic amines having no hydrogen attached to the ring carbon in the 4-position.

(8) Heterocyclic secondary amines in which the ring is resonance stabilized and contains no ring carbon directly attached to hydrogen and in which only two bonds of the nitrogen are attached to the ring.

The amines of items 4–8 are from U.S. Patent 2,762,832 and yield N-tricyanovinylamines on reaction with tetracyanoethylene.

(9) Phenols containing at least one hydrogen bonded to annular carbon at a position other than meta in the phenol ring. (Compounds of this type are described in U.S. Patent 2,762,833, Heckert.)

(10) Azomethines of the type R—CH=N—X where R is a member of the class consisting of hydrogen, alkyl, cycloalkyl, aralkyl, aryl (including substituted aryl), and dialkylamino, and X is of the class consisting of hydroxy, alkoxy, aralkoxy, aryl, and amino. Particularly preferred are those in which R is alkyl, cycloalkyl, aralkyl, or aryl (including substituted aryl), and X is aryl or amino.

It will be understood that the term "amino" includes the recognized substituted amino groups such as alkylamino, arylamino (i.e., anilino), dialkylamino, N-alkyl-N-arylamino, ureido, thioureido, and guanidino. The preparation of these compounds is described in assignee's McKusick and Roland U.S. application Ser. No. 732,129 filed May 1, 1958.

(11) Azomethines of the types:

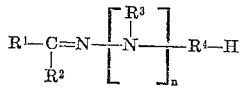

and

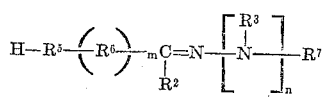

where $n$ and $m$ are the same or different and represent a cardinal number no greater than 1, i.e., zero or one, $R^1$ and $R^3$ are the same or different and represent a member of the group consisting of hydrogen and hydrocarbyl radicals (i.e., alkyl, cycloalkyl, aralkyl, or aryl hydrocarbon); $R^2$ is one of the group consisting of hydrogen, alkyl, cycloalkyl, aralkyl, and aryl; $R^4$ is 1,4-arylene, $R^5$ is a member of the group consisting of 2,5-furylene and 2,5-pyrrylene; $R^6$ is vinylene; and $R^7$ is a member of the group consisting of aryl, hydroxy, alkoxy, carbamyl, thiocarbamyl, and amidino.

The aryl moieties in $R^2$, $R^4$, and $R^7$ include carbocyclic aryl such as phenyl, naphthyl, and anthryl, and heterocyclic aryl such as thienyl, pyrryl, indolyl, furyl, oxazolyl, pyridyl, and quinolyl and substituted derivatives of these groups. (The preparation of these compounds is described in assignee's U.S. application of McKusick and Roland, Ser. No. 732,130 filed May 1, 1958.)

(12) 1-acyl-2-arylhydrazines in which the aryl moiety has a hydrogen in the 4-position (Roland U.S. application Ser. No. 754,917 filed Aug. 14, 1958).

(13) Vinyl amines such as Fisher's base (2-methylene-1,3,3-trimethylindoline).

(14) Aminoarylolefins such as 1,1-bis-(p-dimethylaminophenyl)ethylene.

In a preferred embodiment of this invention, a color-former of the type shown above is incorporated into a silver halide emulsion coated to form an image recording layer in a photographic element. The element is exposed to an object or to an image in the usual manner and the exposed element then developed in an aqueous alkaline solution of one of the developers of this invention. As the silver is reduced the developer is oxidized. The oxidized product reacts in situ with the color former to yield a dye. The reduced silver is then bleached and removed in the usual manner, leaving a colored image corresponding to the exposure given to the photographic element. By the use of multiple layers of photographic emulsions containing different color formers in separate layers and suitable light filtering layers, full color images may be prepared either in negative form for copying or in positive form for printing or projection.

The process of this invention may be carried out over the full temperature range of liquid aqueous systems, i.e., from about 0° C. to about 100° C. However, many photographic elements are injured by hot water and temperatures in the range of about 10–45° C. are generally used.

In the following examples which illustrate but are not intended to limit the invention, the parts are by weight unless otherwise indicated.

EXAMPLE I

Part A

A photographic emulsion of silver bromoiodide in a gelatin binder and containing dispersed m-dimethylamino-phenol is prepared as follows. The following solutions are prepared:

Solution A:
 40 ml. 3 N aqueous ammonium bromide
 5 ml. 0.5 N aqueous potassium iodide
 25 ml. 10% aqueous solution of a polyalkylene ether of oleyl alcohol made by condensing one mol of oleyl alcohol with 20 mols of ethylene oxide
 50 ml. water Solution B:
 32 ml. 3 N aqueous silver nitrate
 Sufficient 20% aqueous ammonia to convert silver to soluble amine salt (about 18 ml.).
 200 ml. water Under a red photographic safe light, solution B is added to solution A at 30° C. with mild stirring over a period of about 30 sec. The mixture is stirred for 30 minutes at 30° C. and then allowed to settle for 30 minutes. The supernatant liquid is decanted and discarded. To the sedimented grains there is added 45 ml. of water and the mixture is stirred for 10 minutes at 30° C. This yields suspension X.

To suspension X is added 10 ml. of 10% aqueous gelatin and the mixture is stirred for 5 minutes at 35° C. To 25 ml. of this mixture is added 90 ml. of 10% aqueous gelatin and the mixture is stirred 10 minutes at 35° C. Viscosity is adjusted by diluting with about 15 ml. of water. The resulting mixture is filtered through felt. To the filtered mixture is added a paste prepared by grinding together the following:

0.5 g. m-dimethylaminophenol
3.0 ml. water
2.0 ml. approx. 1% aqueous C-cetyl betaine The mixture is stirred for 10 minutes at 35° C. and then coated on gelatin-subbed cellulose acetate film base and dried to yield a photographic film.

Part B

A strip of the photographic film prepared as in Part A is exposed to light and then developed in the following developer solution:

0.3 g. tetracyanoethane
3.6 g. sodium sulfite (anh.)
0.4 g. potassium bromide
2.0 g. sodium carbonate (monohydrate)
Water to make 100 ml.

Successive areas of the exposed strip are given varying development time by immersing the strip deeper into the developer solution at 30 second intervals for a total of 5 minutes. The developed strip is then washed for 4 minutes in water and bleached for 10 minutes in the following bleaching solution:

6.0 g. potassium ferricyanide
2.0 g. boric acid
0.5 g. borax
200 ml. water

The bleached film is washed in water for 8 minutes, fixed in 25% hypo for 5 minutes, washed again in water for 7 minutes and dried. There is obtained an excellent magenta-colored stepwedge image, the darker areas being those developed for longer times.

Part C

Two strips of the photographic film prepared as in Part A are given identical exposures under a stepwedge negative. The strips are developed for 6 minutes and 14 minutes respectively in the following developer solution:

0.85 g. tetracyanoethane
1.25 g. potassium bromide
250 ml. 5% aqueous sodium bicarbonate The developed strips are washed in water for 4 minutes and bleached in the following bleaching solution:

10 g. potassium ferricyanide
25 g. potassium oxalate
5 ml. 28% acetic acid
Water to make 500 ml.

After bleaching, the strips are washed, fixed and washed again as in Part B. Both of the films show a magenta-colored stepwedge, the darker one being the one developed longer.

In this example the magenta color is primarily due to the reaction of tetracyanoethylene with m-dimethylaminophenol to form 5-dimethylamino-2-tricyanovinylphenol.

EXAMPLE II

Part A

A photographic emulsion is prepared starting with 25 ml. of suspension X prepared as in Part A of Example I. To this is added 0.5 ml. of 0.5% hypo solution and the mixture is stirred 5 minutes at 35° C. Then 10 ml. of a 5% aqueous solution of an amine-modified polyvinyl alcohol (prepared as in Example IV of U.S. 2,829,053) is added and the mixture stirred for 5 minutes at 30° C. To this is added 100 g. of an 8% solution of m-(3-methylsalicylamido)-benzaldehyde polyvinyl acetal color former in 20% aqueous ethanol and the mixture is stirred 5 minutes at 30° C. The pH is adjusted to 9.0 by adding dilute diaqueous sodium hydroxide. Viscosity is adjusted by adding about 15 ml. of 20% ethanol and the mixture is filtered through felt. To the filtrate is added 2 ml. of 1% aqueous C-cetyl betaine. The mixture is coated on subcoated cellulose acetate and dried to yield a photographic film.

Part B

A strip of this film is exposed under a stepwedge negative and developed for 6 minutes in a developing solution prepared as follows:

3.0 g. sodium bicarbonate
1.0 g. sodium sulfate
0.2 g. potassium bromide
100 ml. water
0.25 g. tetracyanoethane
2 ml. pyridine Before development the solution is adjusted to pH 9.5 by adding dilute aqueous sodium hydroxide. After development the film is washed for one minute and fixed in the following solution:

600 g. hypo
37.5 g. sodium sulfite (anh.)
45 g. borax
30 ml. glacial acetic acid
50 g. potassium alum
Water to make 2500 ml. (Solution used diluted 1 part to 2 parts water)

After fixing, the film is washed for 9 minutes in 3% aqueous sodium sulfate. The film is bleached in an oxalate bleach of the type shown in Part C of Example I. After bleaching, it is rinsed in water, fixed for 5 minutes in 25% hypo, washed for 9 minutes in 3% sodium sulfate, rinsed in water and dried. The resulting film is a magenta-colored stepwedge, the color being formed by reaction of tetracyanoethylene with m-(3-methylsalicylamido)benzaldehyde polyvinyl acetal. In this color formation the acetal is converted at least in part to m-(3-methyl-5-tricyanovinylsalicylamido)benzaldehyde polyvinyl acetal.

Other developers which may be substituted for all or part of the tetracyanoethane in the foregoing examples include the following:

p-Bis(1-cyano-1-ethoxycarbonylmethyl)benzene
p-Bis(1-cyano-1-allyloxycarbonylmethyl)benzene
2-(p-nitrophenyl)-3-(N-phenylcarbamyl)succinonitrile
2-(p-cyanophenyl)-3-(N-cyclohexyl-N-stearylcarbamyl) succinonitrile
2-(N-cyclohexyl-N-stearylcarbamyl)-3-(p-tolylsulfonyl) succinonitrile
1,4-bis(cyanonitromethyl)naphthalene
9,10-dihydro-9,10-bis(dicyanomethyl)anthracene
2-chloro-3-phenylsulfonylsuccinonitrile
2-N,N-didecylcarbamyl-3-fluorosuccinonitrile
2-bromo-3-nitrosuccinonitrile
1,1,2-tricyanoethyl nitrate
1,1,2-tricyanoethyl benzenesulfonate
1,2-dicyano-2-(N-ethylcarbamyl)ethyl acetate
1,2-dicyano-2-(N-decylcarbamyl)ethyl t-butyl ether
diethyl ester of 2,3-dicyano succinic acid
2,3-dicarbamylsuccinonitrile
2,3-diacetylsuccinonitrile
1,4-bis[cyano(ethoxycarbonyl)methyl]benzene
1,4-bis(dicyanomethyl)benzene The above compounds can be made by known procedures. Representative procedures describing the preparation of the last two compounds follow:

PREPARATION OF 1,4-BIS[CYANO(ETHOXYCARBONYL) METHYL]BENZENE

To the alcohol-free sodium ethoxide from 12 parts of sodium is added 293 parts of ethyl carbonate, 87 parts of toluene, and 39 parts of p-xylylenedicyanide. This mixture is heated with stirring until material (mostly ethanol) begins to distill through a distilling column attached to the reactor. Toluene is added to the reaction mixture at the same rate that distillate is collected until the head temperature reaches 115° C. This process requires the addition of about 217 parts of toluene. To the cooled reaction mixture is added 300 parts of water and 42 parts of glacial acetic acid. The oil that separates is collected, and the aqueous phase is extracted with two 71-part portions of ether. The combined oil and ether extracts are dried over magnesium sulfate and freed of volatile material by distillation at 15 mm. pressure at 80–100° C. The oil that remains is distilled, and the portion that boils at 223° C./2.7 mm. to 231° C./2.0 mm. is collected. The resulting 1,4-bis[cyano(ethoxycarbonyl)-methyl]benzene weighs 33 parts (44% yield) and crystallizes slowly to a moist solid when stored at room temperature. The infrared spectrum of this material shows bands at 4.45 microns (—C≡N) and 5.72 microns (ester>C=O). When an ethanol solution of this material is mixed with ammoniacal silver nitrate, a silver mirror forms, and the solution develops a deep blue color.

PREPARATION OF 1,4-BIS(DICYANOMETHYL)BENZENE

Part A.—1,4-Bis(Dicyanomethylene)Cyclohexane

A mixture of 140 parts of malononitrile, 112 parts of 1,4-cyclohexanedione, 63 parts of acetic acid, and 20 parts of ammonium acetate in 1760 parts of benzene is heated under reflux using a water separator for about two hours or until the theoretical amount of water has been removed. The reaction mixture is cooled and the solid product which precipitates is collected by filtration and washed well with water. Recrystallization from ethyl acetate gives 159 parts (76.5% yield) of 1,4-bis(dicyanomethylene)cyclohexane, M.P. 197–212° C. A sample for analysis is prepared by several recrystallizations from ethyl acetate, M.P. 204–210° C.

Analysis.—Calcd. for $C_{12}H_8N_4$: C, 69.2; H, 3.9; N, 26.9. Found: C, 69.43; H, 4.09; N, 26.30.

Part B.—1,4-Bis(Dicyanomethylene)Cyclohexadiene

A solution of 76.5 parts of 1,4-bis(dicyanomethylene)-cyclohexane in 1174 parts of acetonitrile is stirred at 50° C. under a nitrogen atmosphere while 160 parts of N-bromosuccinimide is added in small portions over a 45-minute period. The reaction mixture is stirred at the same temperature for an additional 45 minutes. It is then chilled to −20° C. and a solution of 72 parts of pyridine in 714 parts of ether is added. After stirring at −15° to −20° C. for an additional 15 minutes, the reaction mixture is allowed to warm to room temperature. Cold water is added and the precipitate which forms is collected by filtration and recrystallized from ethyl acetate to give 641 parts (84% yield) of rust-colored crystals of 1,4-bis(dicyanomethylene)cyclohexadiene, M.P. 289–291° C. (dec.). A sample for analysis is prepared by recrystallization from ethyl acetate. This product can be sublimed under high vacuum at 200° C. with 97% recovery. It sublimes, apparently unchanged, when heated above 250° C. at atmospheric pressure. When a few crystals are crushed between micro cover glasses and heated on a Fisher melting point block, a deep blue film forms on the glass plates starting at about 200° C.

*Analysis.*—Calcd. for $C_{12}H_4N_4$: C, 70.6; H, 1.97; N, 27.45. Found: C, 71.32; H, 2.00; N, 28.17.

*Part C.—1,4-Bis(Dicyanomethyl)Benzene*

A solution of 1,4-bis(dicyanomethylene)cyclohexadiene in glacial acetic acid is treated with a molecular excess of thiophenol and allowed to evaporate to dryness. The residue is extracted with ether, and the remaining solid is recrystallized from ethanol to yield 1,4-bis(dicyanomethyl)benzene melting at 244–245° C.

*Analysis.*—Calcd. for $C_{12}H_6N_4$: C, 69.9; H, 2.93; N, 27.2. Found: C, 70.14; H, 2.97; N, 27.45.

Specific color formers which may be substituted for m-dimethylaminophenol in Example I and which are capable of reacting with tetracyanoethylene to form dyes and are therefore useful as components of silver halide emulsion layers to be developed according to the present invention include the following compounds:

N-methylaniline
N,N-dimethylaniline
N,N-diethylaniline
2,6-dimethylaniline
N-methyl-N-(beta-cyanoethyl)aniline
Diphenylamine
N-(beta-cyanoethyl)aniline
Pyrrole
N-methylpyrrole
Tetrahydroquinoline
N-phenylanthranilic acid
N-phenyl-1-naphthylamine
N-phenylmorpholine
Dibenzylaniline
N-n-dodecyldiphenylamine
Julolidine
Indole
N,N,3,6-tetramethylaniline
N-beta-benzoxyethyl-N-methaniline
n-Butylamine
Stearylamine
Benzylamine
Cyclohexylamine
Aniline
Alpha-naphthylamine
Piperidine
o-Aminophenol
2,4-dimethylphenol
2,6-dimethylphenol
p-Cresol
p-Methoxyphenyl(p-methoxyphenylmethylene)amine
p-Chlorobenzaldehyde oxime
p-Dimethylaminobenzaldehyde p-nitrophenylhydrazone
2-(p-dimethylaminobenzalamino)-3,4-dicyano-5-benzylthiopyrrole
p-Dimethylaminobenzaldehyde thiosemicarbazone
2,5-bis(dimethylaminomethyleneamino)-3,4-dicyanothiophene
3-indoleacetaldehyde p-nitrophenylhydrazone
3-pyridinecarboxaldehyde oxime
4-dimethylamino-1-naphthaldehyde p-chlorophenylhydrazone
2,4-dimethoxybenzaldehyde p-tolylhydrazone
1-p-nitroanilino-2(1,3,3-trimethyl-2-indolylidenemethyl)-azomethine
1-guanidino-2-p-tolylazomethine
Quinoline-2-carboxaldehyde 2,4-dinitrophenyl-hydrazone
Formaldehyde p-nitrophenylhydrazone
Benzaldehyde thiosemicarbazone
Acetophenone phenylhydrazone
Benzophenone anil
p-Dimethylaminobenzaldehyde phenylhydrazone
Phenyl(p-dimethylaminophenylmethylene)amine
Piperonal phenylhydrazone
Furfural phenylhydrazone
p-Dimethylaminobenzaldehyde methylphenylhydrazone
Alpha-thenaldehyde phenylhydrazone
Glyoxalphenylosazone
Acetone phenylhydrazone
Salicylaldehyde phenylhydrazone
Beta-(2-furyl)acrolein phenylhydrazone
9-anthraldehyde phenylhydrazone
Hexahydrobenzaldehyde phenylhydrazone
p-(Beta-cyanoethylmethylamino)benzaldehyde phenylhydrazone
Terephthalaldehydic acid phenylhydrazone
Furfuraldehyde semicarbazone
1-formyl-2-phenylhydrazine
1-acetyl-2-phenylhydrazine
1-benzoyl-2-phenylhydrazine
1-(4-toluenesulfonyl)-2-phenylhydrazine
1-(4-dimethylaminobenzoyl)-2-phenylhydrazine
1-stearoyl-2-phenylhydrazine
1-(cyclopropanecarbonyl)-2-phenylhydrazine
1-(alpha-naphthoyl)-2-(1-naphthyl)hydrazine
1-furoyl-2-(o-tolyl)hydrazine
1-methacryloyl-2-(2-benzylphenyl)hydrazine
1-phenoxyacetyl-2-phenylhydrazine
1-cyanoacetyl-2-phenylhydrazine The invention is, of course, not limited to the use of the above color formers in gelatino silver bromoiodide emulsions as they can be used in silver halide emulsions in other water-permeable natural or synthetic colloids including agar-agar, casein, albumin, glycuronic acid, polyvinyl alcohol, hydrophilic polyvinyl acetals, e.g., the benzaldehyde acetal of polyvinyl alcohol, and the copolymers disclosed in Weaver 2,829,053 and Shacklett 2,830,972. The silver halide in the emulsion layers can be silver chloride, silver iodobromide or chlorobromide. Mixed emulsions can be used.

The invention is not limited to the presence of the color formers in an emulsion layer as they can be used in a developer solution with the di-, tri- or tetracyano compound and a suitable alkali and other conventional developer adjuvants. In general, the color formers are used in amounts from 0.01 to about 5.0%, the polycyano compound from 0.1 to about 5.0%, by weight, of the aqueous solution and an alkaline compound in an amount sufficient to produce a pH of at least 7.6. The reducible silver salt image records are developed with the polycyano compound regardless of whether the color former is initially in the aqueous developer solution or in the emulsion layer.

An advantage of this invention is that it provides a new process of producing dye images. Since a large number of different polycyano compounds can be used, the processes and developer solutions can be varied in many ways and dyes of various colors and shades can be obtained. A further advantage is that the invention is simple and can be practiced by the ordinary technician. Still further advantages are that the present process doubles the efficiency of the use of silver during the development as contrasted to conventional processes. As described above, the first step of development involves removal of two hydrogen atoms. This requires two electrons and puts the developer in an activated state. It is similar to conventional procedures in this regard. However, in conventional color coupling development, the next step of color coupling removes two or more hydrogen atoms and, therefore, requires two additional electrons. In the process of this invention, the color coupling step occurs by splitting out HCN or HY and no additional electron transfer is involved.

An additional advantage of this invention is that the colors obtained have pure spectra and, therefore, require no masking. With conventional colors, the spectrum, for example, of a magenta dye may contain also some absorption in the blue region which must be masked out in order to obtain a pure magenta color.

What is claimed is:

1. A process which comprises developing a photographic element containing a reducible silver halide image with a developer solution comprising an aqueous alkaline solution having a pH greater than 7.6 and containing from 0.01% to 5.0% by weight of a color-coupling polycyano developing agent of the formula:

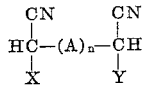

wherein A is a member selected from the group consisting of phenylene and naphthylene, $n$ is a cardinal number taken from the group consisting of 0 and 1, X is a member taken from the class consisting of —CN, —COOR, —CONH$_2$, CONHR, —CONR$_2$, —COR, —NO$_2$, p-O$_2$N-phenyl and p-NC-phenyl, and Y is a member taken from the class consisting of —CN, —COOR, —CONH$_2$, —CONHR, —CONR$_2$, —COR, —SO$_2$R, —NO$_2$, —F, —Cl, —Br, —OR, —ONO$_2$, —OSO$_2$R, and —OCOR, and R is a hydrocarbyl radical of 1 to 18 carbon atoms, in the presence of a color former having at least one hydrogen atom and capable of condensing with tetracyanoethylene to form a dye.

2. A process as set forth in claim 1 wherein said polycyano compound is tetracyanoethane.

3. A process as set forth in claim 1 wherein said polycyano compound is 1,4-bis(dicyanomethyl)benzene.

4. A process as set forth in claim 1 wherein said polycyano compound is 1,4 - bis[cyano(ethoxycarbonyl)-methyl]benzene.

5. A process as set forth in claim 1 wherein $n$ in said formula is 0.

References Cited in the file of this patent

UNITED STATES PATENTS 2,788,356     Heckert _____ Apr. 9, 1957